United States Patent
Seo

(10) Patent No.: US 10,591,172 B2
(45) Date of Patent: Mar. 17, 2020

(54) FLOATING TYPE HUMIDIFIER USING VERTICAL POWER TRANSMISSION SYSTEM

(71) Applicant: MIRO CO., LTD., Incheon (KR)

(72) Inventor: Dong Jin Seo, Incheon (KR)

(73) Assignee: MIRO CO. LTD., Incheon (KR)

( * ) Notice: Subject to any disclaimer, the term of this patent is extended or adjusted under 35 U.S.C. 154(b) by 33 days.

(21) Appl. No.: 15/771,322

(22) PCT Filed: Oct. 26, 2016

(86) PCT No.: PCT/KR2016/012052
§ 371 (c)(1),
(2) Date: Apr. 26, 2018

(87) PCT Pub. No.: WO2017/074001
PCT Pub. Date: May 4, 2017

(65) Prior Publication Data
US 2018/0313556 A1    Nov. 1, 2018

(30) Foreign Application Priority Data
Oct. 26, 2015   (KR) .................. 10-2015-0149025

(51) Int. Cl.
*F24F 6/12*  (2006.01)
*H02J 50/10* (2016.01)
(Continued)

(52) U.S. Cl.
CPC ............ *F24F 6/12* (2013.01); *F24F 11/0008* (2013.01); *F24F 13/20* (2013.01); *H02J 7/025* (2013.01);
(Continued)

(58) Field of Classification Search
CPC ........ F24F 13/20; F24F 6/10; F24F 2006/008; H02J 50/10; H04B 5/0037
See application file for complete search history.

(56) References Cited

U.S. PATENT DOCUMENTS 6,592,107 B1 * 7/2003 Wong .................. F24F 6/02
261/107

FOREIGN PATENT DOCUMENTS

| CN | 101963382 A | 2/2011 |
|---|---|---|
| CN | 202316217 U | 7/2012 |

(Continued)

*Primary Examiner* — Frantz F Jules
*Assistant Examiner* — Lionel Nouketcha
(74) *Attorney, Agent, or Firm* — Novick, Kim & Lee, PLLC; Sang Ho Lee

(57) ABSTRACT

A floating humidifier using a vertical power transmission scheme according to an embodiment of the present disclosure includes: a wireless power transmitting unit including a substrate and a vertical structure vertically arranged on the substrate, and configured to transmit electric power in a magnetic induction scheme through the substrate and the vertical structure; a water container including an accommodation portion in which water is accommodated and a fastening portion protruding from a center of the accommodation portion and fitted in the vertical structure above the wireless power transmitting unit; and a humidification generating unit inserted into the fastening portion of the water container through a vertically penetrated fastening hole and configured to generate a current using a magnetic force induced by the wireless power transmitting unit to drive a humidifier.

7 Claims, 4 Drawing Sheets

(51) Int. Cl.
*F24F 13/20* (2006.01)
*H02J 50/80* (2016.01)
*H02J 50/15* (2016.01)
*F24F 11/00* (2018.01)
*H02J 7/02* (2016.01)
*H02J 7/00* (2006.01)
*B01F 3/04* (2006.01)
*B05B 17/06* (2006.01)

(52) U.S. Cl.
CPC ............. *H02J 50/10* (2016.02); *H02J 50/15* (2016.02); *H02J 50/80* (2016.02); *B01F 3/0407* (2013.01); *B05B 17/0623* (2013.01); *H02J 7/0063* (2013.01)

(56) References Cited

FOREIGN PATENT DOCUMENTS

| | | | |
|---|---|---|---|
| CN | 202350235 U | | 7/2012 |
| CN | 105026844 A | | 11/2015 |
| DE | 102007037694 A1 | | 2/2009 |
| JP | 06-084751 U | | 12/1994 |
| JP | 0608475 U | * | 12/1994 |
| KR | 10-1998-0084036 A | | 12/1998 |
| KR | 1998-0084039 A | | 12/1998 |
| KR | 19980084039 A | * | 12/1998 |
| KR | 20120005293 A | * | 1/2012 |
| KR | 10-1293556 B1 | | 8/2013 |
| KR | 10-2014-0001625 A | | 1/2014 |
| KR | 20140001625 A | * | 1/2014 |
| KR | 10-1374967 B1 | | 3/2014 |
| KR | 20-2015-0003491 U | | 9/2015 |

\* cited by examiner

FLOATING TYPE HUMIDIFIER USING VERTICAL POWER TRANSMISSION SYSTEM

TECHNICAL FIELD

Embodiments of the present disclosure relate to a floating humidifier, and more particularly, to a floating humidifier using a vertical power transmission scheme.

BACKGROUND ART

In general, a humidifier, which is a device configured to provide moisture to a dry room, is classified into an ultrasonic humidifier using an ultrasonic wave and a heating humidifier using a heater depending on a humidification method.

First, in the ultrasonic humidifier, after water is changed to fine water drops using an ultrasonic vibrator installed in a water tank, the fine water drops are sprayed using a blower fan in an atomized state. On the other hand, in the heating humidifier, after water is vaporized using heat emitted from a heater installed in a water tank, steam is sprayed using a blower fan in an atomized state.

The two types of humidifiers, which are used while being installed on a fixed installation surface, have disadvantages such as bacterial growth and a cleaning problem. To resolve this, a natural humidifier which is relatively convenient for management such as cleaning has been widely used.

Among the natural humidifiers, a floating humidifier which is relatively convenient for management such as cleaning has been widely used. The floating humidifier is movably installed while floating in the water tank in which water is accommodated.

However, in the conventional humidifier, a water container is fixed. In particular, the conventional floating humidifier has a disadvantage in that a humidification amount is limited. Also, there is inconvenience resulting from a connected wire. Thus, there is a problem in that a large amount of electromagnetic waves occur to wirelessly transmit electric power.

Korean Patent No. 10-1374967 (Title of Invention: Floating humidifier, Registration Date: Mar. 10, 2014) is disclosed as the related prior art.

DISCLOSURE

Technical Problem

An embodiment of the present disclosure provides a floating humidifier using a vertical power transmission scheme, in which electric power is wirelessly transmitted to drive a humidifier.

Problems of the present disclosure are not limited to the above-described problem(s), and other not-described problems could be clearly understood by those skilled in the art with reference to the following descriptions.

Technical Solution

A floating humidifier using a vertical power transmission scheme according to an embodiment of the present disclosure may include a wireless power transmitting unit including a substrate and a vertical structure vertically arranged on the substrate, and configured to transmit electric power in a magnetic induction scheme through the substrate and the vertical structure, a water container including an accommodation portion in which water is accommodated and a fastening portion protruding from a center of the accommodation portion and fitted in the vertical structure above the wireless power transmitting unit, and a humidification generating unit inserted into the fastening portion of the water container through a vertically penetrated fastening hole and configured to generate a current using a magnetic force induced by the wireless power transmitting unit to drive a humidifier.

The substrate may be a printed circuit board (PCB) circuit board connected to a power supply line through which the electric power is supplied and configured to receive the electric power to generate a frequency.

The vertical structure may have a first coil formed in the vertical structure in a spiral shape and connected to the PCB circuit board, and may generate a frequency in a magnetic induction method by the first coil to transmit the electric power.

The vertical structure may have a cross section of any one of a circle and polygons including a triangle and a quadrangle.

The fastening hole may have any one shape of a circle and polygons including a triangle and a quadrangle.

The humidification generating unit may include a battery configured to charge the generated current, and drive the humidifier using the current charged in the battery.

The humidification generating unit may include a coil formed in the humidification generating unit in a spiral shape, and configured to generate a current using a magnetic force induced by the wireless power transmitting unit to drive the humidifier, and in which the humidifier includes: an ultrasonic vibration circuit installed inside the humidification generating unit and configured to generate an ultrasonic signal; and an ultrasonic vibration plate installed to be exposed to an upper surface of the humidification generating unit, inclined by an angle of 1 degree to 20 degrees to minimize water splattering, and vibrating by the ultrasonic signal to generate a humidified particle.

The floating humidifier using a vertical power transmission scheme according to an embodiment of the present disclosure may further include a lid detachably coupled to an upper portion of the water container and configured to have a humidification discharge port to discharge the humidified particle generated by the humidification generating unit.

The lid may further include a fan through which external air is introduced, and drive the fan by receiving the electric power from a second coil embedded at an upper portion of the vertical structure through the coil embedded at a central portion of the lid, which is in contact with the fastening portion of the water container.

The fan may be inclined by an angle of 1 degree to 20 degrees to induce flow of the air inside the water container so as to smoothly discharge the humidified particle.

The floating humidifier using a vertical power transmission scheme according to an embodiment of the present disclosure may further include a sensor configured to determine whether the lid is opened or closed, based on whether the electric power is transmitted/received between the coil embedded at a central portion of the lid and a second coil embedded at an upper portion of the vertical structure, and a power supply control unit configured to terminate supply of the electric power to the humidification generating unit, when it is determined by the sensor that the lid is opened.

Detailed matters of other embodiments are included in the detailed description and the accompanying drawings.

Advantageous Effects

According to an embodiment of the present disclosure, electric power is wirelessly transmitted to operate a humidifier so that more complete waterproofing may be achieved, and there is no wire so that all portions may be easily washed.

That is, according to the embodiment of the present disclosure, a floating humidifier has a structure in which a humidifier body and a water container are completely separated from each other and the water container is also completely separated from a wireless power transmitting unit, so that both a waterproofing problem and an electromagnetic wave problem may be solved. In addition, the product is wirelessly implemented so that complete cleaning may be achieved.

Also, according to the embodiment of the present disclosure, since a plurality of humidifying vibration plates may be mounted, a large amount of humidification may occur.

BEST MODE

Figure 1:
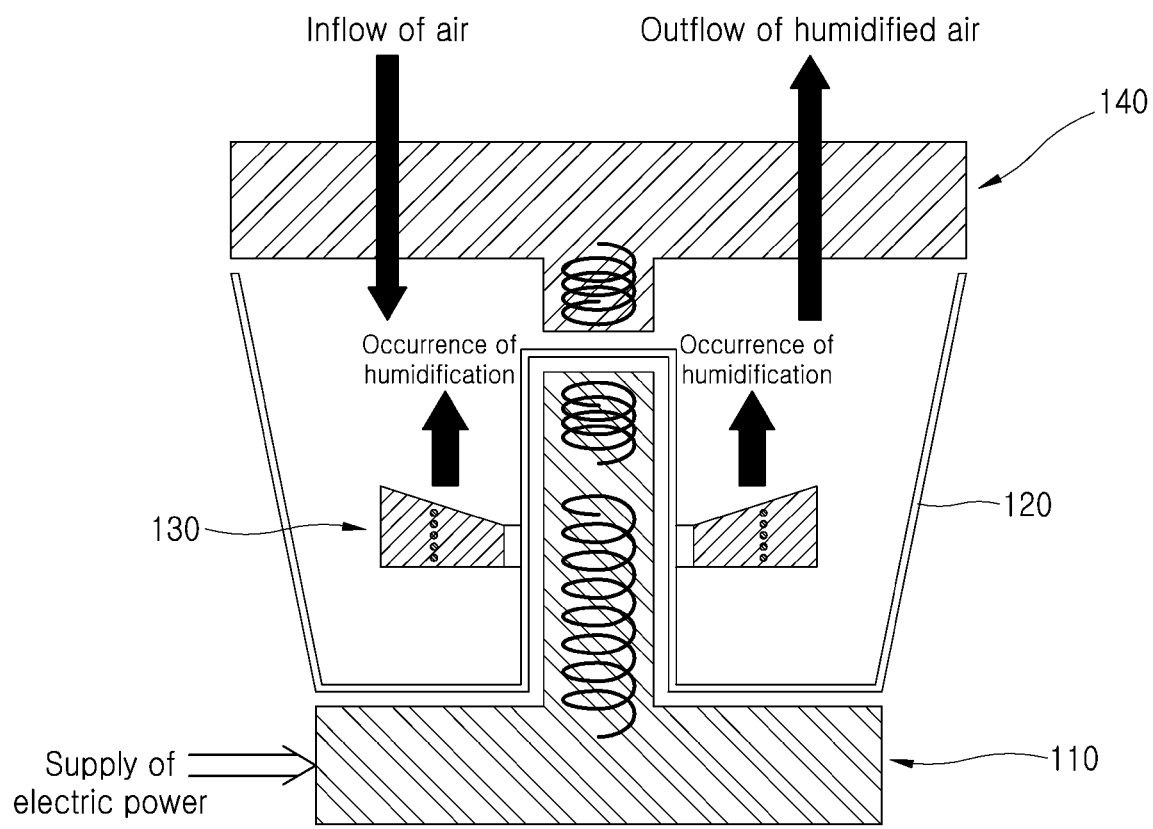
FIG. 1 is a side sectional view for explaining a floating humidifier using a vertical power transmission scheme according to an embodiment of the present disclosure.

Advantages and/or features of the present disclosure and methods for achieving the advantages and/or the features will be clearly described with reference to embodiments which will be described below in detail together with the drawings. However, the present disclosure is not limited to the following embodiments but is implemented in various different forms. The present embodiments merely make the present disclosure complete and are provided to completely notify those skilled in the art to which the present disclosure pertains of the scope of the present disclosure. Further, the present disclosure is merely defined by the scope of the appended claims. Throughout the specification, the same components are designated by the same reference numerals.

Hereinafter, embodiments of the present disclosure will be described in detail with reference to the accompanying drawings.

FIG. 1 is a side sectional view for explaining a floating humidifier using a vertical power transmission scheme according to an embodiment of the present disclosure.

Referring to FIG. 1, a floating humidifier 100 using a vertical power transmission scheme according to an embodiment of the present disclosure includes a wireless power transmitting unit 110, a water container 120, a humidification generating unit 130, and a lid 140.

The wireless power transmitting unit 110 serves to receive electric power from the outside and transmit the electric power to the humidification generating unit 130, which will be described below.

Figure 2:
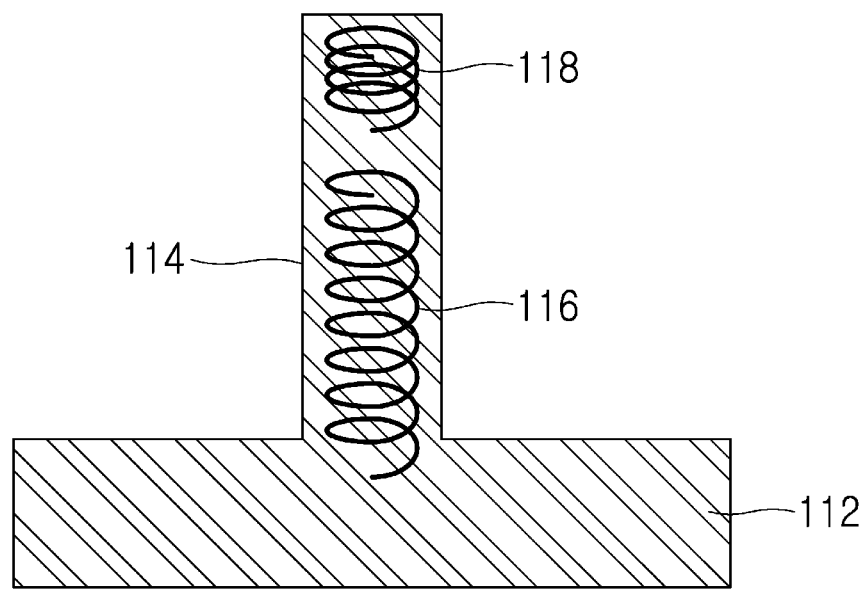
FIG. 2 is a view illustrating a detailed configuration of a wireless power transmitting unit of FIG. 1.

To this end, as illustrated in FIG. 2, the wireless power transmitting unit 110 includes a substrate 112 and a vertical structure 114 vertically arranged on the substrate 112. For reference, FIG. 2 is a view illustrating a detailed configuration of the wireless power transmitting unit 110 of FIG. 1.

The wireless power transmitting unit 110 transmits electric power through the substrate 112 and the vertical structure 114 in a magnetic induction method.

Here, the substrate 112 may be implemented in a printed circuit board (PCB) circuit board that is connected to a power supply line (not illustrated) through which the electric power is supplied and receives the electric power through the power supply line to generate a frequency.

That is, the substrate 112 implemented in the PCB circuit board may receive the electric power through the power supply line to transmit the electric power to the vertical structure 114.

The vertical structure 114 may have a first coil 116 formed therein in a spiral shape and connected to the PCB circuit board.

At this time, the first coil 116 may extend in a lengthwise direction of the vertical structure 114, that is, in a vertical direction. However, the first coil 116 may be spaced apart from a second coil 118 formed at an upper end of the vertical structure 114 by a specific distance.

Here, the state in which the first coil 116 and the second coil 118 are spaced apart from each other by the specific distance is for independently operating the humidification generating unit 130, which will be described below, and a fan (see reference numeral "142" of FIG. 6) of the lid 140, which will be described below. The second coil 118 will be described in detail when the lid 140 is described.

The vertical structure 114 may have a circular cross section, as illustrated in the drawings. However, the vertical structure 114 is not limited thereto, and may have various cross-sectional shapes. For example, the vertical structure 114 may have a cross section of a polygon such as a triangle and a quadrangle.

The vertical structure 114 may generate a frequency in the magnetic induction method by the coil 116 and may transmit the electric power.

Here, the magnetic induction method is a method in which a current is applied to one of adjacent two coils to generate a magnetic field, and an induced electromotive force is generated in the other coil by the medium of the generated magnetic field.

That is, in the embodiment of the present disclosure, a current is applied to the coil 116 embedded in the vertical structure 114 to generate a magnetic field, and an induced electromotive force may be generated in a coil (see reference numeral "134" of FIG. 4) embedded in the humidification generating unit 130 by the medium of the magnetic field generated in the coil 116.

Accordingly, according to the embodiment of the present disclosure, the electric power is wirelessly transmitted to operate the humidifier, and this fact may help a user clean the humidifier perfectly and conveniently. The humidification generating unit 130 that receives the electric power transmitted from the wireless power transmitting unit 110 through the magnetic induction method between the wireless power transmitting unit 110 and the humidification generating unit 130 will be described below with reference to FIG. 4.

Figure 3:
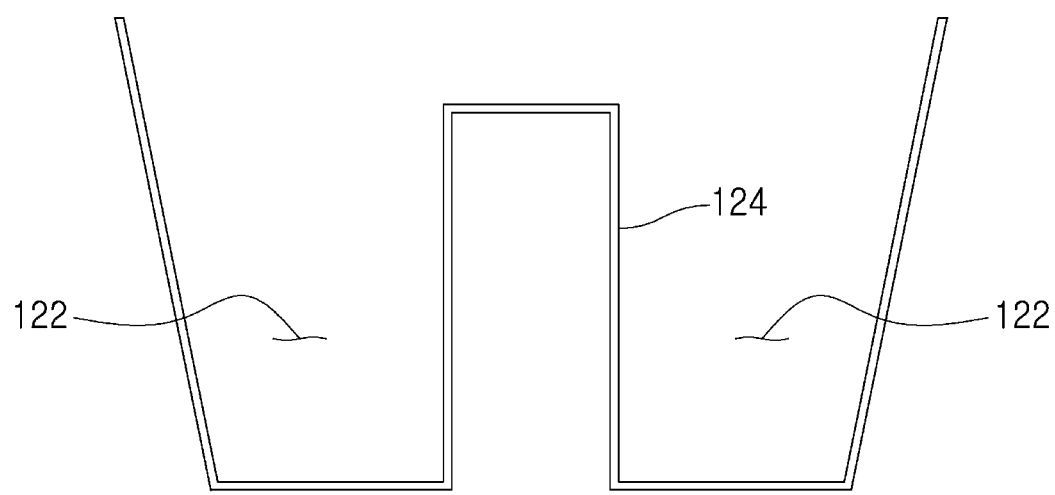
FIG. 3 is a view illustrating a detailed configuration of a water container of FIG. 1.

As illustrated in FIG. 3, the water container 120 may include an accommodation portion 122 in which water is accommodated and a fastening portion 124 protruding from the center of the accommodation portion 122 and fitted in the vertical structure 114 above the wireless power transmitting unit 110. For reference, FIG. 3 is a view illustrating a detailed configuration of the water container 120 of FIG. 1.

Here, the accommodation portion 122 may be formed of a transparent material such that the user may identify a water level by eyes, and may have a gradation displayed on an outer side thereof such that the user may put a proper amount of the water in the accommodation portion 122. Also, the accommodation portion 122 may have a water level sensor configured to notify of an alarm when the water is overflowing or insufficient.

The fastening portion 124 may be formed to have the same shape as the cross section of the vertical structure 114 to be smoothly coupled to the vertical structure 114 of the wireless power transmitting unit 110. That is, the fastening portion 124 may have a circular shape as illustrated in the drawing and may be formed in a polygon such as a triangle and a quadrangle.

The water container 120 may be designed to have a convenient structure for lifting up or carrying the water container 120 by a hand. That is, since the water container 120 may be carried while the upwardly protruding fastening portion 124 is lifted up by a hand, the water container 120 is designed to have a convenient structure for carrying.

Figure 4:
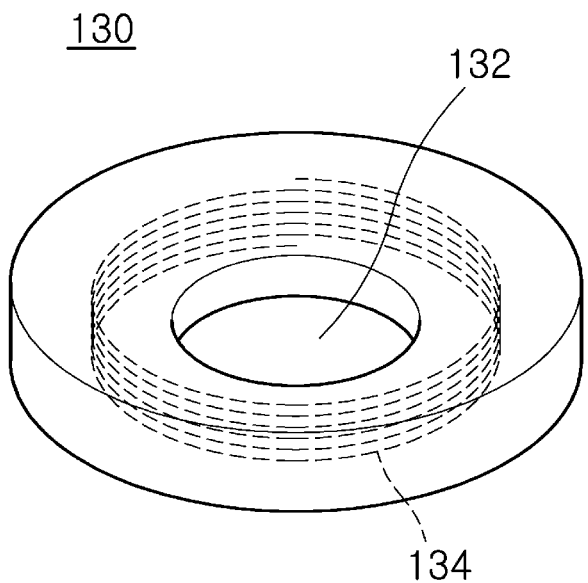
FIG. 4 is a view illustrating a detailed configuration of a humidification generating unit of FIG. 1.

As illustrated in FIG. 4, the humidification generating unit 130 has a vertically penetrated fastening hole 132. The humidification generating unit 130 is inserted into the fastening portion (see reference numeral "124" of FIG. 3) of the water container 120 through the fastening hole 132. For reference, FIG. 4 is a view illustrating a detailed configuration of the humidification generating unit of FIG. 1.

Here, the fastening hole 132 may have a circular shape, as illustrated in the drawing. However, the present disclosure is not limited thereto. Further, the fastening hole 132 may be formed in a polygon such as a triangle and a quadrangle.

While being inserted into the fastening portion of the water container 120, the humidification generating unit 130 generates a current using a magnetic force induced by the wireless power transmitting unit 110, and operates a humidifier (not illustrated) using the generated current.

To this end, the humidification generating unit 130 may have a coil 134 formed therein in a spiral shape. The humidification generating unit 130 generates a current using a magnetic force induced by the wireless power transmitting unit 110, and operates the humidifier using the generated current.

Although not illustrated, the humidification generating unit 130 may include a battery configured to charge the generated current. The humidification generating unit 130 may operate the humidifier using the current charged in the battery.

Here, although not illustrated in the drawing, the humidifier may include an ultrasonic vibration circuit and an ultrasonic vibration plate. The ultrasonic vibration circuit is installed in the humidification generating unit to generate an ultrasonic signal. The ultrasonic vibration plate is installed to be exposed to the upper surface of the humidification generating unit 130, is inclined by an angle of 1 degree to 20 degrees to minimize water splattering, and vibrates by the ultrasonic signal to generate a humidified particle.

Meanwhile, when a large amount of humidification is generated through the humidifier, the ultrasonic vibration circuit is added to the humidification generating unit 130 so that the plurality (two or more) of ultrasonic vibration plates may be inserted. Also, two or more ultrasonic spraying holes may be formed in the humidifier.

The lid 140 serves to open or close the water container 120. To this end, the lid 140 may be detachably coupled to an upper portion of the water container 120.

The lid 140 serves to discharge the humidified particle generated by the humidification generating unit 130 to the outside, and at the same time, to induce the discharge of the humidified particle by introducing air.

Figure 5:
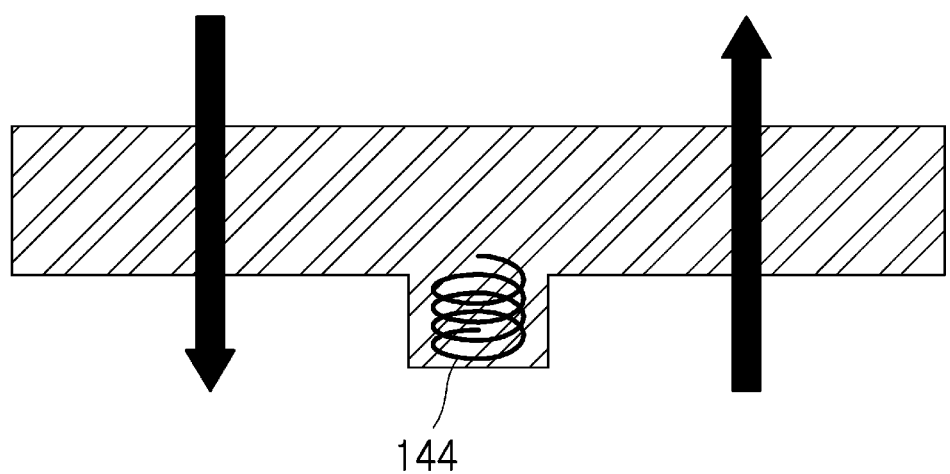
FIGS. 5 and 6 are views illustrating a detailed configuration of a lid of FIG. 1.
Figure 6:
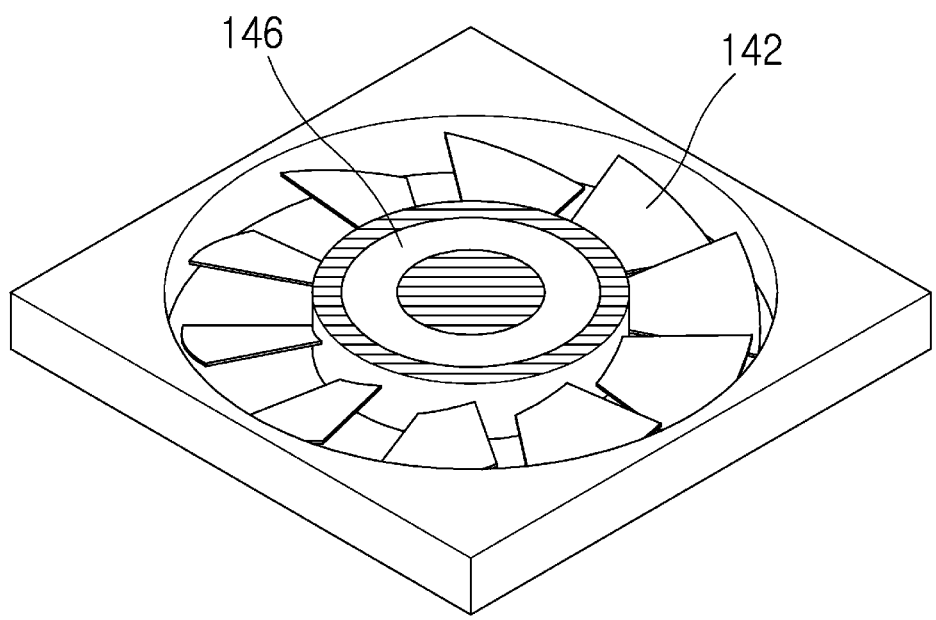

To this end, as illustrated in FIGS. 5 and 6, the lid 140 may include a fan 142, a coil 144, and a humidification outlet 146. For reference, FIGS. 5 and 6 are views illustrating a detailed configuration of the lid 140 of FIG. 1.

The fan 142 may have a plurality of wings formed in a circle and formed at a portion thereof through which the air is introduced. At this time, it is preferable that the plurality of wings has a structure in which the wings are not vertically mounted, and wind is transferred in a diagonal direction, so that while the air rotates, the humidified particle may be more easily discharged to the outside. That is, the fan 142 may be inclined by an angle of 1 degree to 20 degrees to help flow of the air inside the water container 120 so as to discharge more humidified air. Meanwhile, the fan 142 is formed in a general fan shape and is arranged at a portion of the lid 140, to transfer the wind into the water container 120 so as to make the flow of the air.

The coil 144 may be embedded in a central portion that is in contact with the fastening portion 124 of the water container 120. The coil 144 may receive the electric power from the second coil (see reference numeral "118" of FIG. 2) embedded at an upper end of the vertical structure 114 of the wireless power transmitting unit 110, and may operate the fan 142 using the received electric power.

The humidification outlet 146, which is a hole (a circular hole in the present embodiment) formed by vertically penetrating the lid 140, may discharge the humidified particle generated by the humidification generating unit 130 to the outside. At this time, the humidified particle may be more easily discharged to the outside through the flow (rotation) of the air by driving of the fan 142.

Figure 7:
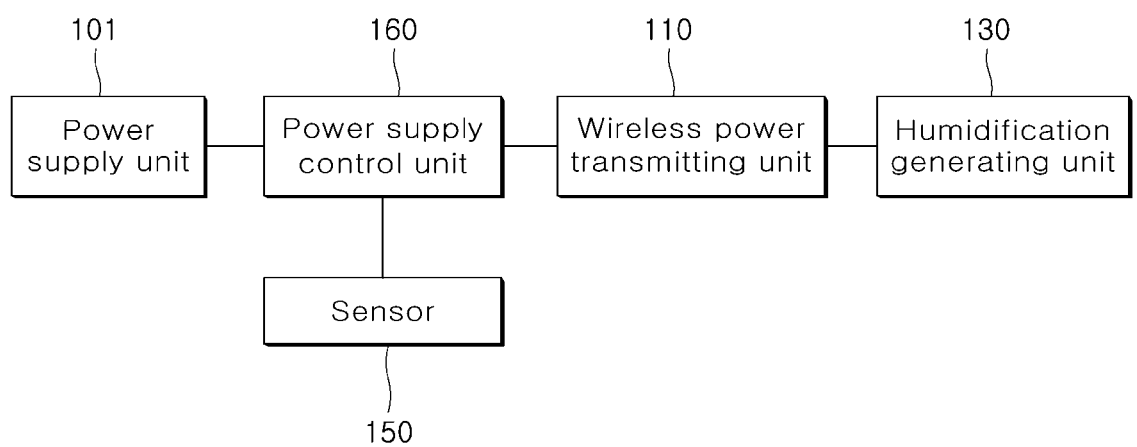
FIG. 7 is a block diagram for explaining a power control method for the floating humidifier using a vertical power transmission scheme according to the embodiment of the present disclosure.

FIG. 7 is a block diagram for explaining a power control method for the floating humidifier using a vertical power transmission scheme according to the embodiment of the present disclosure.

Referring to FIGS. 1 and 7, a sensor 150 may determine whether the lid 140 is opened or closed based on whether electric power is transmitted and received between the coil (see reference numeral "144" of FIG. 5) embedded at the central portion of the lid 140 and the second coil (see reference numeral "118" of FIG. 2) embedded at the upper portion of the vertical structure 114 of the wireless power transmitting unit 110.

That is, the sensor 150 may determine that the lid 140 is opened, when the electric power is not transmitted/received between the coil of the lid 140 and the second coil of the wireless power transmitting unit 110. On the other hand, the sensor 150 may determine that the lid 140 is closed, when the electric power is transmitted/received between the coil of the lid 140 and the second coil of the wireless power transmitting unit 110.

When it is determined by the sensor 150 that the lid 140 is opened, a power supply control unit 160 may terminate supply of the electric power to the humidification generating unit 130.

To this end, the power supply control unit 160 may perform a control such that a power supply unit 101 is switched off, to interrupt the supply of the electric power from the power supply unit 101, so as to terminate the supply of the electric power to the humidification generating unit 130.

Thereafter, when it is determined by the sensor 150 that the lid 140 is closed, the power supply control unit 160 may perform a control such that the power supply unit 101 is switched on, to resume the supply of the electric power from the power supply unit 101, so as to supply the electric power to the humidification generating unit 130 through the wireless power transmitting unit 110 again.

Accordingly, according to the embodiment of the present disclosure, the supply of the electric power to the wireless power transmitting unit 110 may be controlled depending on whether the lid 140 is opened or closed, so that humidified air may be efficiently discharged through introduction of the air in a state in which the lid is closed.

Although the detailed embodiments of the present disclosure have been described until now, it is apparent that various modifications may be conceived without departing from the scope of the present disclosure. Therefore, the scope of the present disclosure is not limited to the described embodiments and should be defined by the scope of the appended claims and equivalents to the scope of the appended claims.

Although the present disclosure has been described with reference to the delimited embodiments and the drawings as above, the present disclosure is not limited to the above-described embodiments. Various modifications and changes may be conceived by those skilled in the art to which the present disclosure pertains from the description. Thus, the spirit of the present disclosure should be determined only by the appended claims, and all equivalents and variations belong to the scope of the spirit of the present disclosure.

The invention claimed is:

1. A floating humidifier using a vertical power transmission scheme, the floating humidifier comprising:
   a wireless power transmitting unit including a substrate and a vertical structure vertically arranged on the substrate, and configured to transmit electric power in a magnetic induction scheme through the substrate and the vertical structure;
   a water container including an accommodation portion in which water is accommodated and a fastening portion protruding from a center of the accommodation portion and fitted in the vertical structure about the wireless power transmitting unit;
   a humidification generating unit inserted into the fastening portion of the water container through a vertically penetrated fastening hole and configured to generate a current using a magnetic force induced by the wireless power transmitting unit to drive the floating humidifier,
   wherein the vertical structure has a first coil formed in the vertical structure in a spiral shape and connected to the substrate, and generates the frequency in a magnetic induction scheme by the first coil to transmit the electric power,
   wherein the humidification generating unit includes a humidification generating unit coil formed in the humidification generating unit in a spiral shape, and configured to generate a current using a magnetic force induced by the first coil to drive the floating humidifier; and
   a lid detachably coupled to an upper portion of the water container and configured to have a humidification discharge port to discharge humidified particles generated by the humidification generating unit,
   wherein the lid includes a lid coil embedded at a portion of the lid facing the fastening portion of the water container and a fan through which external air is introduced,
   wherein the lid coil drives the fan by receiving the electric power from a second coil embedded at an upper portion of the vertical structure, and
   wherein the first coil is spaced apart from the second coil.

2. The floating humidifier of claim 1, wherein the substrate is a printed circuit board (PCB) connected to a power supply line through which the electric power is supplied and configured to receive the electric power to generate a frequency.

3. The floating humidifier of claim 1, wherein the vertical structure has a cross section of any one of a circle and polygons including a triangle and a quadrangle.

4. The floating humidifier of claim 1, wherein the fastening hole has any one shape of a circle and polygons including a triangle and a quadrangle.

5. The floating humidifier of claim 1, wherein the humidification generating unit includes a battery configured to charge the generated current, and drives the humidifier using the current charged in the battery.

6. The floating humidifier of claim 1, wherein the fan is inclined by an angle of 1 degree to 20 degrees to induce flow of the air inside the water container so as to smoothly discharge the humidified particles.

7. The floating humidifier of claim 1, further comprising:
   a sensor configured to sense whether the electric power is transmitted/received between the lid coil and the second coil embedded at the upper portion of the vertical structure, wherein the lid is closed when the sensor senses that electric power is transmitted/received and the lid is open when the sensor senses that electric power is not transmitted/received.

\* \* \* \* \*